Figure 2:
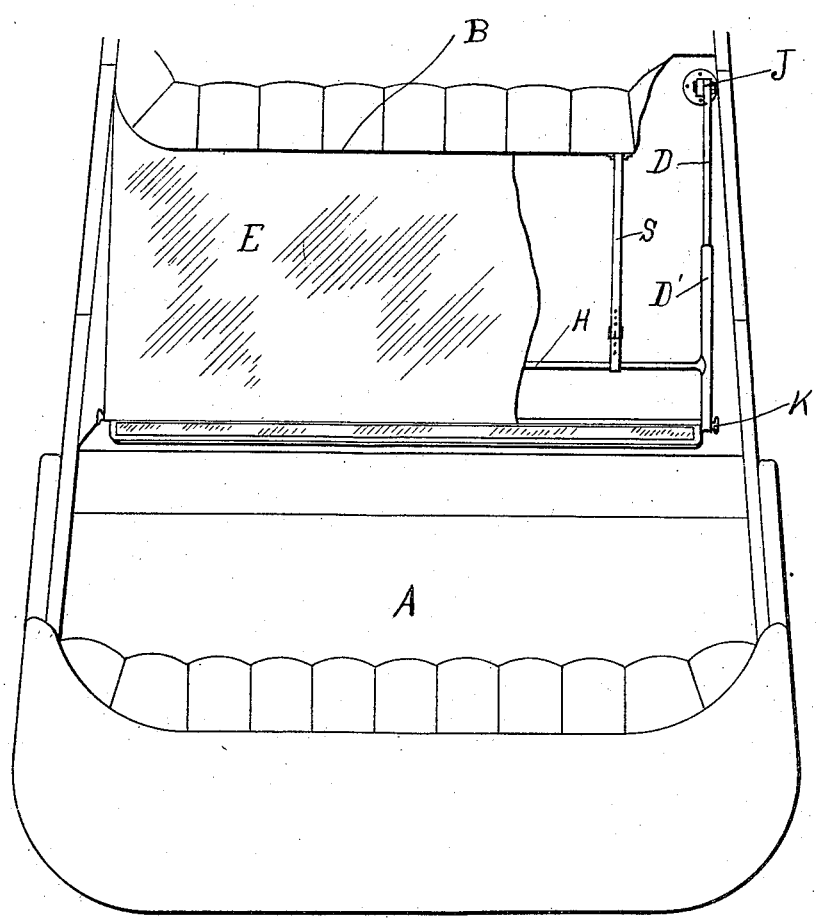

R. G. LUMB.
TONNEAU WIND SHIELD FOR AUTOMOBILES.
APPLICATION FILED JULY 12, 1916.
1,262,364.
Patented Apr. 9, 1918.
2 SHEETS—SHEET 1.
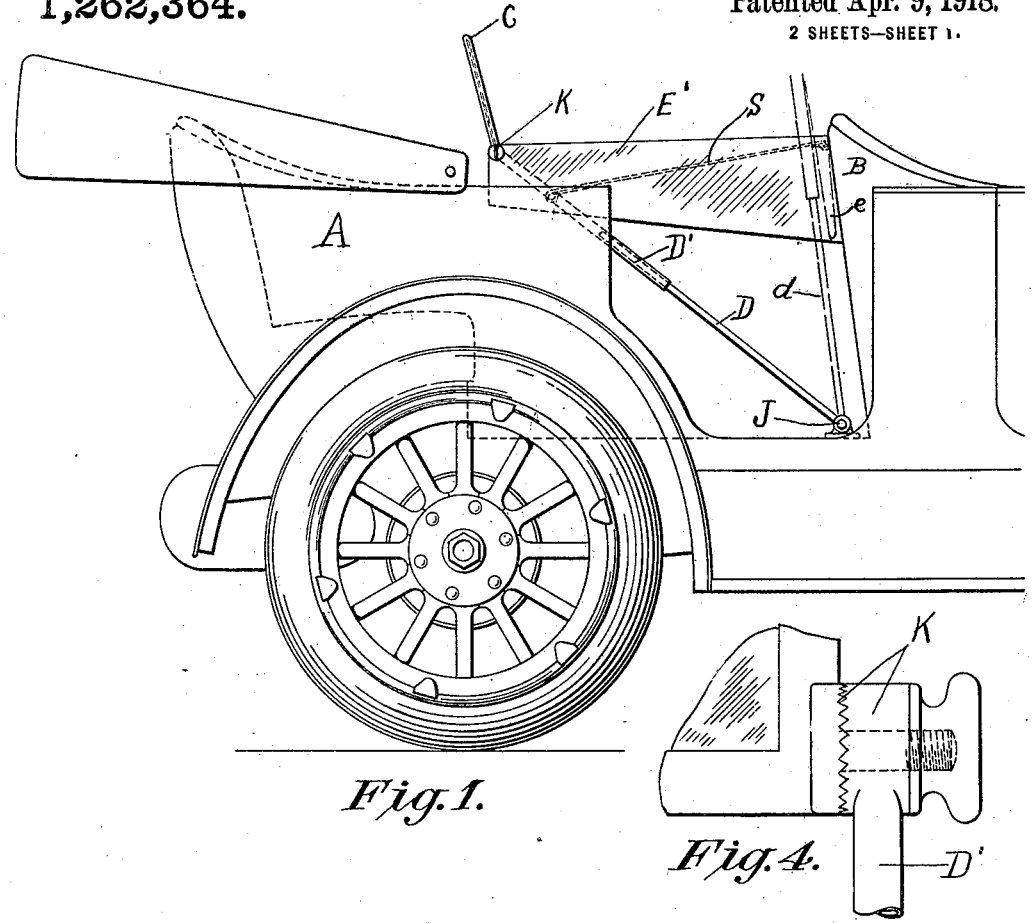
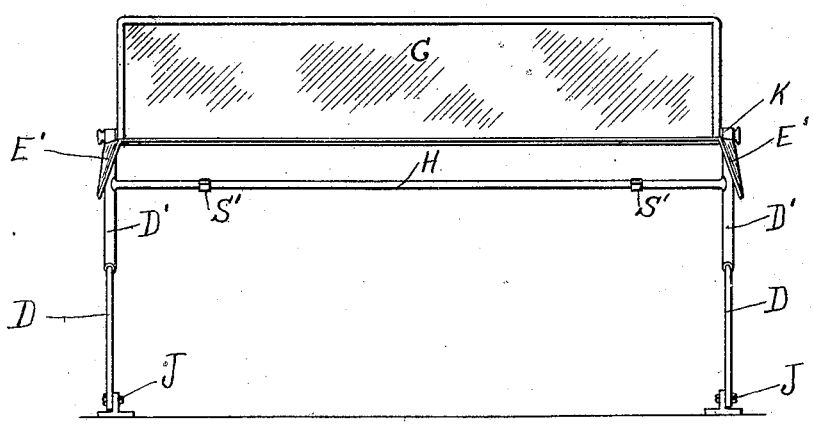
Witnesses:
Henrietta H. Stevens
Edith M. Bromley
Ralph G. Lumb INVENTOR
BY James L. Jenks
ATTORNEY

UNITED STATES PATENT OFFICE.

RALPH G. LUMB, OF PAWTUCKET, RHODE ISLAND.

TONNEAU WIND-SHIELD FOR AUTOMOBILES.

1,262,364.   Specification of Letters Patent.   Patented Apr. 9, 1918.

Application filed July 12, 1916.   Serial No. 108,923.

*To all whom it may concern:*

Be it known that I, RALPH G. LUMB, a citizen of the United States, residing at Pawtucket, in the county of Providence and State of Rhode Island, have invented certain new and useful Improvements in Tonneau Wind-Shields for Automobiles, of which the following is a specification.

My invention relates to improvements in wind-shields for automobiles and the particular object of my invention is to provide a wind-shield for the rear or tonneau seat of an automobile which shall be supported wholly by connection with the floor of the tonneau, and which at the same time shall be capable of adjustment to suit the convenience of the occupants of the rear or tonneau seat. I accomplish these objects by the mechanism shown in the accompanying drawings, in which—

Figure 1 is a side elevation of the tonneau of an automobile with my wind-shield in position.

Fig. 2, a plan view of the same.

Fig. 3, an elevation of my invention, and

Fig. 4, a detail of the adjusting mechanism.

The same parts are referred to by the same letters throughout the various views.

In Fig. 1, A represents the rear or tonneau portion of an ordinary automobile, B being the front seat.

My device, which is seen best in Fig. 3, consists substantially of the uprights D—D sliding into tubular members D'—D' and cross-braced by the member H which is fastened to the tubular members D'—D'.

C represents a panel or shield of glass or other transparent material in a suitable frame connected to the members D'—D' by the joints K—K, which joints permit any desired angular adjustment of the panel C.

Again referring to Fig. 1, the members D—D are connected to the floor boards of the tonneau by the hinged joints or pivots J—J and by means of these joints the entire wind-shield with the supports may be swung from the position shown by the full lines D—D' in Fig. 1 to the position shown in the dotted lines *d*, Fig. 1; in other words, may be pushed forward so as to lie in close proximity to the back of the front seat B.

S throughout the various views, is a strap of leather, or other material, fastened at one end to the back of the front seat B and at the other end to the cross-brace H of the wind-shield at the two points indicated by S'—S', Fig. 3, the swing of the wind-shield from front to back being adjustable by means of ordinary buckles upon the straps S.

Connected to the bottom of the panel C for its entire length is an apron E of rubber or canvas, or other flexible material, which is connected at its front edge to the back of the front seat B, and has the side flaps E'—E' shown in Fig. 3, this apron with its flap serving to keep the inmates of the rear seat dry and warm. When the wind-shield is pushed forward, the apron simply folds up between the shield and the back of the front seat, as shown by the dotted line *e* in Fig. 1.

I am aware that prior to my invention, wind-shields of various designs for use in the tonneau or rear seat of an automobile have been devised, and are in quite general use. So far as I am aware, however, all of these wind-shields for the rear seat have been supported wholly by connection with the back of the front seat, and require either a special front seat constucted for their use, or expensive modifications of the front seat, so as to provide suitable strength for the support of a shield. Such wind-shields, so far as is known to your applicant, are not adapted to be applied to an automobile except by means of a material and costly modification of the front seat, as above stated, and it is my principal purpose in the present invention to provide a wind-shield that can be attached to any automobile provided with a tonneau, requiring simply to be screwed to the floor by ordinary screws and being capable of having the straps connected to the back of any front seat whatever by ordinary strap clips.

Having now described my invention, what I claim and desire to secure by Letters Patent is:—

In a tonneau wind shield, a pair of spaced rigidly connected extensible swinging uprights supported by and hinged to the floor of the tonneau, a transparent panel supported by said uprights and occupying a position distant from the front seat of an automobile when in operative position, an adjustable connection between said uprights and the front seat, and a flexible foldable apron having flexible foldable side flaps and located between said panel and the front seat, said apron having its rear edge attached to the lower edge of said panel and having its front edge attached to the back of the front seat.

In testimony whereof I affix my signature in presence of two witnesses.

RALPH G. LUMB.

Witnesses:
　EDITH M. BROMLEY,
　HENRIETTA F. STEVENS.

Copies of this patent may be obtained for five cents each, by addressing the "Commissioner of Patents, Washington, D. C."